United States Patent [19]
Parkinson

[11] 4,136,346
[45] Jan. 23, 1979

[54] RECORDER PEN WITH INK JET WRITING DEVICE

[75] Inventor: Truman D. Parkinson, Mount Prospect, Ill.

[73] Assignee: Gould Inc., Rolling Meadows, Ill.

[21] Appl. No.: 826,736

[22] Filed: Aug. 22, 1977

Related U.S. Application Data

[63] Continuation of Ser. No. 656,302, Feb. 9, 1976, abandoned.

[51] Int. Cl.² .......................................... G01D 15/18
[52] U.S. Cl. ................................................ 346/140 R
[58] Field of Search .................................... 346/140 R

[56] References Cited

U.S. PATENT DOCUMENTS

| | | | |
|---|---|---|---|
| 899,043 | 9/1908 | Harris | 346/140 R |
| 2,950,164 | 8/1960 | Albright | 346/140 R |
| 3,054,109 | 9/1962 | Brown | 346/140 R X |
| 3,088,788 | 5/1963 | Brown | 346/139 R X |
| 3,683,212 | 8/1972 | Zoltan | 346/75 X |
| 4,065,775 | 12/1977 | Hou | 346/140 R |

FOREIGN PATENT DOCUMENTS 1027233 4/1966 United Kingdom ..................... 346/140

*Primary Examiner*—Joseph W. Hartary
*Attorney, Agent, or Firm*—Phillip H. Mayer; Charles E. Snee, III

[57] ABSTRACT

A chart recorder writing pen of the kind in which the oscillating shaft of a motor drives an arm in a plane perpendicular to the shaft through a linkage causing the writing tip of the arm to move in a straight line; the writing device of the pen being an ink jet supplied with ink through a substantially rigid conduit having substantial portions on opposite sides of the axis of the shaft and being journaled on an axis colinear with the motor shaft axis.

5 Claims, 4 Drawing Figures

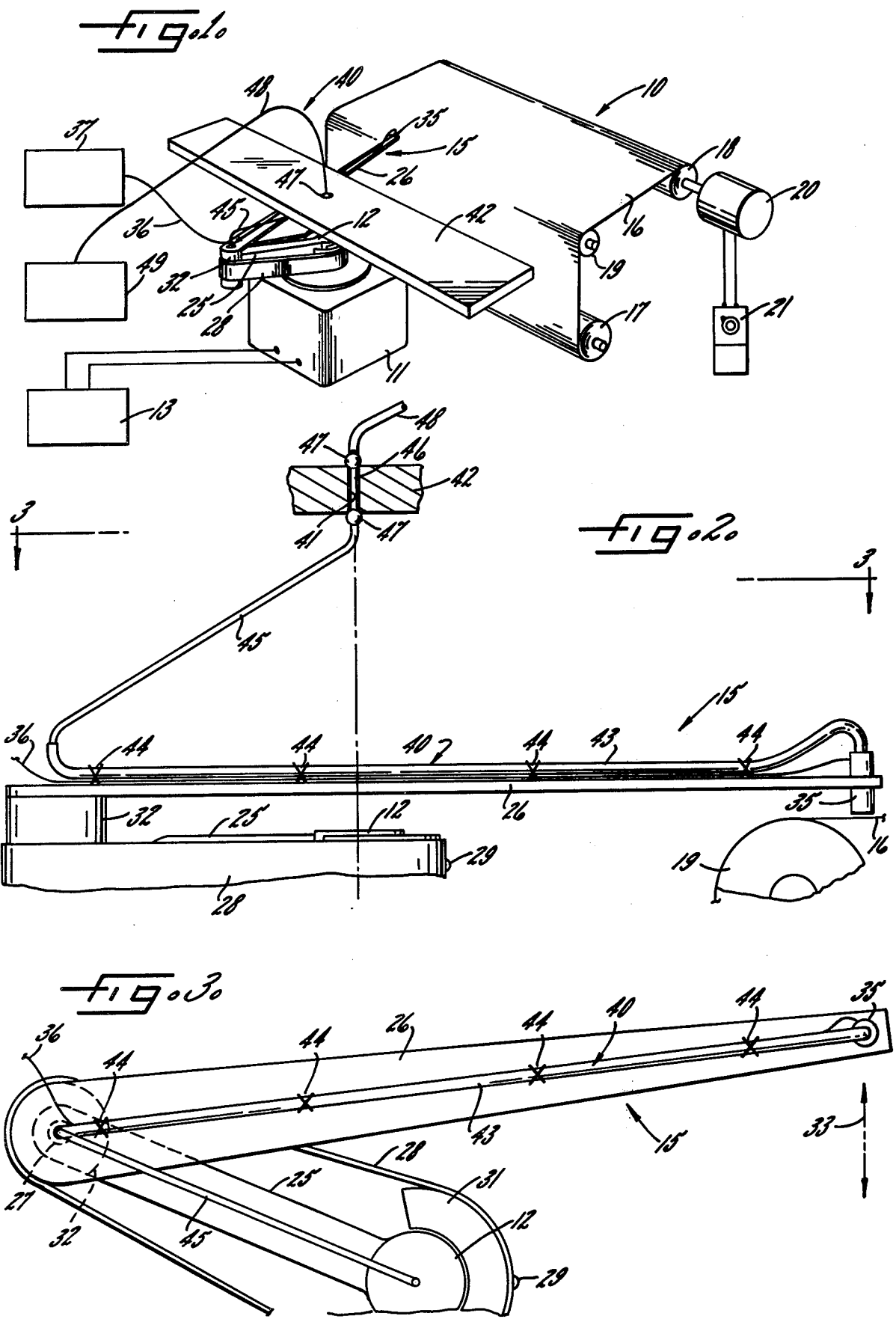

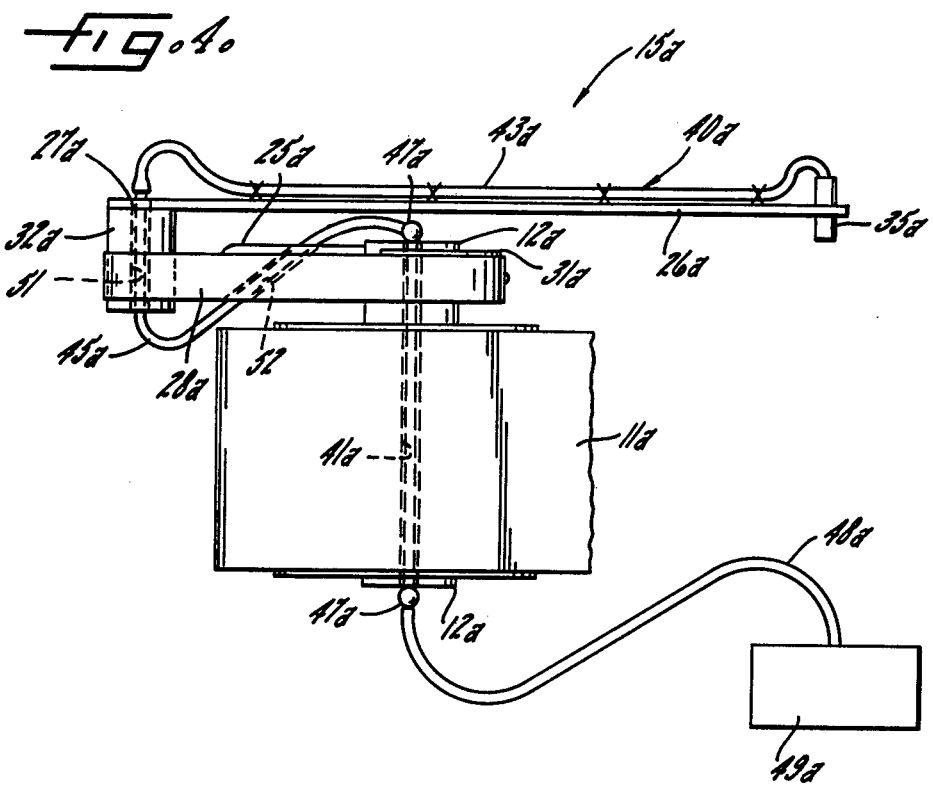

RECORDER PEN WITH INK JET WRITING DEVICE

This is a continuation, of application Ser. No. 656,302, filed Feb. 9, 1976 now abandoned.

This invention relates generally to writing devices for chart recorders and more particularly concerns adapting such a device for ink jet writing.

The writing pen for a modern chart recorder must function from a state of not moving at all as the chart paper moves under the pen to a condition of sweeping through a straight line amplitude of, typically, up to four or five inches and at oscillating frequencies of up to 100 Hz. The writing tip of such pens are therefore subject to considerable variations in velocity and acceleration-deceleration forces.

The term ink jet commonly identifies that type of writing device in which ink is ejected as a series of droplets from a fine nozzle in response to physical pulses imposed on the ink in or near the nozzle. Since the rate at which droplets are generated can be controlled by the frequency of the pulses imposed, an ink jet writing device is particularly well suited for chart recorder applications because the writing speed, i.e., droplet generation rate, can be adjusted to the rate of pen movement and thus produce a suitable trace at widely varying pen speeds. Such frequency modulation to produce uniform traces is the subject of U.S. application Ser. No. 639, 644, filed Dec. 11, 1975, now U.S. Pat. No. 4,065,775, assigned to the assignee of the present invention.

However, on the negative side, since an ink jet normally requires an ink conduit running out to the writing tip of the pen, the high G forces which can be imposed by rapid pen movements create problems, both in maintaining ink flow as well as not slinging unwanted ink from the nozzle, when an ink jet is used in such an application.

Accordingly, it is the primary aim of the invention to provide an ink jet writing pen arrangement for a chart recorder that will function effectively and not sling ink at the expected forces imposed by acceleration.

It is another object of the invention to provide an arrangement of the above character which is well suited for initial design analysis wherein, for a given practical application, the dimensions and relative proportions of the parts can be selected and balanced to give desired performance. Stated another way, performance factors such as length and linearity of pen stroke, pen response speed, ink jet writing rate and absence of ink slinging can be predicted and traded off against one another to arrive at the best design for a given application.

It is also an object to provide an arrangement of the above type which is lightweight and otherwise unrestraining to the response of the pen mechanism.

A further object is to provide an arrangement as referred to above whose parts are simple and straightforward and hence economical to manufacture.

Other objects and advantages of the invention will become apparent upon reading the following detailed description and upon reference to the drawings, in which:

FIG. 1 is a fragmentary schematic of a chart recorder embodying the invention;

FIG. 2 is an enlarged section of portions of the recorder shown in FIG. 1;

FIG. 3 is a fragmentary section taken approximately along the line 3—3 in FIG. 2; and FIG. 4 is a fragmentary, partially schematic elevation of a second embodiment of the invention.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Turning to the drawings, there is schematically shown a chart recorder 10 having a motor 11 which oscillates its output shaft 12 in response to signals from a source 13 so as to drive a writing pen 15 transversely on chart paper 16 being fed from a supply roll 17 to a take-up roll 18 over a platen roll 19 by a motor 20. The speed of the chart paper is selected by a controller 21 coupled to the motor 20.

So as to move the writing tip of the pen 15 linearly, or substantially linearly, in proportion to oscillation of the motor shaft 12, a pen mechanism of the kind disclosed in U.S. Pat. No. 3,088,788, issued May 7, 1963, is utilized in which the motor output shaft 12 carries a lever 25 whose free end moves in proportion to movement of the periphery of the shaft 12. An arm 26 is pivoted at 27 on the end of the lever 25 so as to swing in a plane spaced from and perpendicular to the shaft 12; that plane being parallel to the chart paper 16 where the writing is to take place. A flexible band 28 is anchored at 29 on a fixed cylindrical column 31 partially surrounding the shaft 12, and the band 28 is firmly wrapped around both the column 31 and a cylindrical portion 32 of the arm 26. The result is that the non-pivoted, writing tip end of the arm 26 moves in a substantially linear path 33 at an amplitude and frequency proportional to the oscillating movement of the shaft 12 and the arm 25; the path 33 and the lever 25 being on opposite sides of the motor output shaft 12. Such structure, its operation and the various design factors involved are more fully described in said U.S. Pat. No. 3,088,788.

Pursuant to the invention, the writing pen 15 of the recorder utilizes as the writing device an impulse ink jet 35 of the kind shown in U.S. Pat. No. 3,683,212, issued August 8, 1972. The ink jet 35 is fixed at the non-pivoted end of the arm 26 and is oriented so as to write on the paper 16 being transported past the pen 15. Electrical pulses are imposed on the ink jet 35, thereby causing a drop of ink to be ejected for each command pulse, through wire leads 36 attached along the length of the arm 26 and running to a control 37 which, preferably, generates pulses at a rate proportional to the rate of relative movement between the ink jet 35 and the paper 16 as is taught in United States patent application Ser. No. 639,644, filed Dec. 11, 1975 and assigned to the assignee of the present invention. As disclosed in said application, this generates a uniform density trace line regardless of the relative speed between the ink jet 35 and the paper 16.

In accordance with the invention, ink is conveyed to the ink jet 35 through a substantially rigid conduit 40 running the length of the arm 26 from the ink jet 35 to the pivot 27, and then back to be pivoted in an opening 41 that is colinear with the axis of the motor shaft 12. In the embodiment being described, the pivot opening 41 is a simple hole formed in an archor block 42 fixed above the pen 15. The conduit 40 is preferably formed in three parts. That part 43 directly connected to the ink jet 35 comprises a length of energy absorbing viscoelastic conduit which is held substantially rigid in the sense of being firmly tied down to the arm 26 at a number of spaced points 44. The conduit part 43 does retain those resilient characteristics that prevent pressure pulse reflections, as the ink jet 35 is impulsed, from interferring with subsequent droplet formation, as is taught in U.S. Pat. No. 3,832,579, issued Aug. 27, 1974. This insures uniform droplet size so that the frequency modulation of the control 37 can reliably produce a uniform density trace.

The second conduit part is, preferably, a stainless steel tube 45 having a portion 46 journaled in the opening 41 and held in place by beads 47 formed on the tube at the ends of the opening 41. From the opening 41, the tube 45 is bent back to the pivoted end of the arm 26 where the plastic conduit part 43 is fitted over it, thereby providing the slight flexibility required at the arm pivot 27. The steel tube 45 is, of course, rigid although pivotable in the opening 41. The third conduit part is, for convenience, another length of plastic tubing 48 fitted over the upper end of the tube 45 and leading to an ink supply 49.

In operation, there is no uncontrolled whipping of the ink supplying conduit 40 despite the speed at which the writing pen 15 is driven. The conduit part 43 is secured to the arm 26. The tube 45 pivots easily in the block 42 but is otherwise rigid. There is only slight turning of the plastic parts 43 and 48 where they join the tube 45, and no other distortion or stretching of the conduit 40.

The ink in the conduit 40 is, however, subject to substantial inertial forces created by the acceleration and deceleration of the lever 26 and the arm 25. Because of the geometry of the parts, and in particular the location of the axis represented by the opening 41, a measurable length of tubing rotates about the axis of the opening 41 and a measurable length of tubing rotates about the pivot 27. Analyzing the pen 15 for its performance when recording a signal producing sinusoidal motion of varying frequency and amplitude shows that the highest velocity is reached by the ink jet 35 as it sweeps through the center of its side-to-side stroke, i.e., when the arm 26 is alined above the lever 25, and the maximum acceleration occurs at the end of each stroke as the ink jet 35 stops and changes direction. Under these conditions, it is relatively easy to calculate that in a recorder in which the arm 26 and lever 25 lengths are approximately 4-½ and 1-½ inches, respectively, a maximum velocity of about 282 inches per second is reached by, and a maximum acceleration force of approximately 139 g's is imposed on, the ink jet 35 at scanning frequencies up to 30 Hz. and scanning amplitudes up to 3 inches. However, because the ink in the conduit part 43 which is rotating about the arm pivot 27 is, in effect, partially counterbalanced by the ink in the tube 45 which is rotating about the axis of the motor shaft 12, excessive pressures which could affect delivery of the ink are not developed. At the maximum velocity of the ink jet 35, a nagative pressure is induced on the ink in the ink jet and, at the maximum acceleration, a positive pressure is so induced. However, with the dimensions and velocity values stated, the maximum negative pressure is less than the pressure which can be easily resisted by the surface tension of the ink meniscus across a 2-3 mil ink jet orifice, the nominal size of such orifices. Such negative pressure will therefore not be sufficient to de-prime the ink jet between ink droplet pulses. And also in the example stated, the maximum positive pressure, while greater than that which could sling ink from the jet were it not operating, is still low enough not to interfere with the frequency modulated ejection of ink droplets. In this connection, it will be understood that normally ink droplets will be continuously ejected when the pen is moving rapidly and it has been found that at the droplet generation rates called for when the pen is moving rapidly, insufficient positive pressure is developed, because of the counterbalancing effect, to interfere with droplet formation and timing.

Because of the coincidence of the axes of the motor shaft 12 and the opening 41, and the absence of unpredictable whipping or stretching of the conduit 40, the effect of various size, range and frequency pen parameters can be reliably calculated and, if necessary, design tradeoffs can be made to obtain a pen that will perform properly for a given application.

An alternate embodiment is shown in FIG. 4 in which parts corresponding to those previously described have been given the same reference numerals with the distinguishing suffix a added. Thus, a writing pen 15a is shown driven by a motor 11a through a shaft 12a carrying a lever 25a that pivots, at 27a, an arm 26a. A flexible band 28a, column 31a and cylindrical portion 32a of the arm 26a operate to move the non-pivoted, writing tip end of the arm 26a, which carries an ink jet 35a, in a substantially linear path at an amplitude and frequency proportional to the oscillating movement of the shaft 12a and the arm 25a.

In keeping with the invention, the ink jet 35a is fed with ink from an ink supply 49a through a length of plastic tubing 48a and a substantially rigid conduit 40a running, in this embodiment, through an opening 51 on the axis of the pivot 27a, through a passage 52 in the arm 25a, and through an opening 41a on the center of the motor shaft 12a. The conduit 40a is formed of a viscoelastic conduit part 43a, and a stainless steel tube 45a appropriately shaped and fitted through the opening 41a by beads 47a.

Because the opening 41a is, in this case, coincident with the axis of the shaft 12a, it will be apparent that the relationships described above in connection with the FIG. 2 embodiment hold true for this embodiment of FIG. 4. Moreover, the FIG. 4 embodiment avoids the need for a separate and spaced anchor block 42.

It can therefore be seen that an ink jet writing pen for a chart recorder has been provided with an ink feed arrangement that will not interfere with proper operation of the ink jet at the expected forces imposed by velocity and acceleration. The arrangement is lightweight and virtually unrestraining on the pen mechanism so as to not interfere with proper response of the recorder. Those skilled in the art will also appreciate that the design is simple and straightforward so as to be economical to manufacture and maintain.

While the present invention was conceived and developed for an ink jet type of writing pen, those skilled in the art will recognize that its advantages can also be utilized with a writing pen of a pressurized ink system type wherein the pen itself is simply a droplet or stream forming and directing nozzle that is fed with ink through a conduit from a pressurized ink supply. In the following claims, the expression "ink pen" is intended to be generic.

I claim as my invention:

1. A chart recorder writing pen including, in combination, a motor having an oscillating output shaft responsive to the amplitude and frequency of the signal to be charted, a lever fixed on said shaft and having an end whose movement is proportional to the movement of the periphery of the shaft, an arm pivoted at one end on said lever end so as to swing in a plane spaced from and perpendicular to said shaft, means for controlling the pivoting of said arm so that the non-pivoted end of the arm moves in a linear path at an amplitude and frequency proportional to movement of said lever end, said path and said lever end being on opposite sides of said shaft, an ink jet pen mounted on the non-pivoted end of said arm perpendicular to said plane, means including an opening colinear with the axis of said shaft and spaced from said arm, means defining a conduit for ink and having a first, substantially rigid portion extending from said ink pen along said arm to the pivoted end thereof and further having a second portion doubling back from the pivoted end along a path which is fixed relative to said lever to pass through said opening colinearly with said axis, whereby whipping of said conduit portions is minimized, and means for supplying ink to said conduit.

2. The combination of claim 1 in which said means defining a conduit to and through said opening includes a rigid tube journaled in said opening and bent toward the pivoted end of said arm, and said means defining a conduit from said ink pen along said arm to the pivoted end thereof includes a viscoelastic tube bound substantially rigidly to the arm and fitted onto said rigid tube.

3. The combination of claim 1 in which said means including an opening is an anchor block fixed with respect to said motor.

4. The combination of claim 1 in which said means including an opening comprises a passage through said arm and said opening is formed through said motor shaft.

5. In a chart recorder writing pen assembly having pen an arm for mounting an ink pen at one end, a motor for producing oscillation about an axis in response to signals, and mechanism coupling said motor and said arm so that the motor drives the arm in a plane perpendicular to and spaced from the motor, the improvement comprising, in combination, an ink jet pen mounted at said one end, means defining an opening alined with said axis and spaced from said plane, and a substantially rigid conduit journaled through said opening and extending to said ink jet pen with a substantial loop on the side of said axis opposite said ink jet pen, said loop being of sufficient length to effect a balance of acceleration forces on ink in said conduit whereby slinging of ink from said ink jet pen is minimized.

* * * * *